United States Patent
Wade et al.

(10) Patent No.: US 8,910,868 B1
(45) Date of Patent: Dec. 16, 2014

(54) FIRMWARE MANAGEMENT

(71) Applicant: Square, Inc., San Francisco, CA (US)

(72) Inventors: Jeremy Wade, San Francisco, CA (US); Dan Post, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/203,463

(22) Filed: Mar. 10, 2014

Related U.S. Application Data

(60) Provisional application No. 61/909,626, filed on Nov. 27, 2013.

(51) Int. Cl.
*G06K 7/08* (2006.01)
*G06K 7/00* (2006.01)

(52) U.S. Cl.
CPC .............. *G06K 7/0095* (2013.01); *G06K 7/082* (2013.01)
USPC ........................................................ 235/449

(58) Field of Classification Search
USPC ............. 235/380, 439, 449, 472.01; 455/557, 455/558
See application file for complete search history.

(56) References Cited

U.S. PATENT DOCUMENTS

| | | |
|---|---|---|
| 3,854,036 A | 12/1974 | Gupta et al. |
| 4,254,441 A | 3/1981 | Fisher |
| 4,788,420 A | 11/1988 | Chang et al. |
| 5,173,597 A | 12/1992 | Anglin |
| 5,589,855 A | 12/1996 | Blumstein et al. |
| 5,679,943 A | 10/1997 | Schultz et al. |
| 6,021,944 A | 2/2000 | Arakaki |
| 6,032,859 A | 3/2000 | Hughes et al. |
| 6,061,666 A | 5/2000 | Do et al. |
| 6,234,389 B1 * | 5/2001 | Valliani et al. ................. 235/380 |
| 6,400,517 B1 | 6/2002 | Murao |
| 6,476,743 B1 | 11/2002 | Brown et al. |
| 7,309,012 B2 | 12/2007 | Von Mueller et al. |
| 7,600,673 B2 | 10/2009 | Stoutenburg et al. |
| 7,703,676 B2 | 4/2010 | Hart et al. |
| 7,757,953 B2 | 7/2010 | Hart et al. |
| 7,793,834 B2 | 9/2010 | Hachey et al. |
| 7,810,729 B2 | 10/2010 | Morley, Jr. |
| 8,011,587 B2 * | 9/2011 | Johnson et al. .......... 235/472.01 |
| 8,231,055 B2 | 7/2012 | Wen |
| 8,297,507 B2 | 10/2012 | Kayani |
| 8,336,771 B2 | 12/2012 | Tsai et al. |
| 8,376,239 B1 | 2/2013 | Humphrey |
| 8,500,010 B1 | 8/2013 | Marcus et al. |

(Continued)

FOREIGN PATENT DOCUMENTS

WO        2010/111130         9/2010

*Primary Examiner* — Seung Lee
(74) *Attorney, Agent, or Firm* — Novak Druce Connolly Bove + Quigg LLP

(57) ABSTRACT

Aspects of the subject disclosure provide a card reader for receiving payment card information at a mobile point-of-sale terminal. In some implementations, a reader of the subject technology can include a memory, a conditioning module and a 3.5 mm audio plug including an audio bus that is configured for insertion into a headphone port of a host device, such as a smart phone or tablet computer. Implementations of the subject technology also include a microprocessor configured to perform operations for determining whether a newer firmware version is available for the card reader or whether a download of such a firmware needs to be completed, and in response to determining such a download is needed, performing a download of the firmware via the audio plug during periods of inactivity.

16 Claims, 4 Drawing Sheets

(56) References Cited

U.S. PATENT DOCUMENTS

| | | | |
|---|---|---|---|
| 8,560,823 B1 * | 10/2013 | Aytek et al. ................ 713/2 |
| 8,571,989 B2 | 10/2013 | Dorsey et al. |
| 8,573,487 B2 | 11/2013 | McKelvey |
| 8,573,489 B2 | 11/2013 | Dorsey et al. |
| 8,584,946 B2 | 11/2013 | Morley, Jr. |
| 8,602,305 B2 | 12/2013 | Dorsey et al. |
| 8,612,352 B2 | 12/2013 | Dorsey et al. |
| 8,615,445 B2 | 12/2013 | Dorsey et al. |
| 8,640,953 B2 | 2/2014 | Dorsey et al. |
| 8,662,389 B2 | 3/2014 | Dorsey et al. |
| 8,678,277 B2 | 3/2014 | Dorsey et al. |
| 8,701,996 B2 | 4/2014 | Dorsey et al. |
| 8,701,997 B2 | 4/2014 | Dorsey et al. |
| 8,763,900 B2 | 7/2014 | Marcus et al. |
| 8,794,517 B1 | 8/2014 | Templeton et al. |
| 2002/0017568 A1 | 2/2002 | Grant et al. |
| 2002/0165462 A1 | 11/2002 | Westbrook et al. |
| 2003/0132300 A1 | 7/2003 | Dilday et al. |
| 2004/0033726 A1 | 2/2004 | Kao |
| 2004/0104268 A1 | 6/2004 | Bailey |
| 2004/0128256 A1 | 7/2004 | Dhanjal et al. |
| 2004/0151026 A1 | 8/2004 | Naso et al. |
| 2005/0156037 A1 | 7/2005 | Wurzburg |
| 2005/0156038 A1 | 7/2005 | Wurzburg et al. |
| 2005/0194452 A1 | 9/2005 | Nordentoft et al. |
| 2005/0219728 A1 | 10/2005 | Durbin et al. |
| 2005/0236480 A1 | 10/2005 | Vrotsos et al. |
| 2005/0247787 A1 | 11/2005 | Von Mueller et al. |
| 2006/0000917 A1 | 1/2006 | Kim et al. |
| 2006/0049255 A1 | 3/2006 | von Mueller et al. |
| 2006/0152276 A1 | 7/2006 | Barksdale |
| 2007/0063048 A1 | 3/2007 | Havens et al. |
| 2008/0017712 A1 | 1/2008 | Hart et al. |
| 2008/0040274 A1 | 2/2008 | Uzo |
| 2010/0108762 A1 | 5/2010 | Morley, Jr. |
| 2010/0243732 A1 | 9/2010 | Wallner |
| 2010/0314446 A1 | 12/2010 | Morley, Jr. |
| 2011/0053560 A1 * | 3/2011 | Jain et al. ................ 455/411 |
| 2011/0062235 A1 | 3/2011 | Morley, Jr. |
| 2011/0084140 A1 | 4/2011 | Wen |
| 2011/0161235 A1 | 6/2011 | Beenau et al. |
| 2011/0174879 A1 | 7/2011 | Morley, Jr. |
| 2011/0180601 A1 | 7/2011 | Morley, Jr. |
| 2011/0202463 A1 | 8/2011 | Powell |
| 2012/0011024 A1 | 1/2012 | Dorsey et al. |
| 2012/0011071 A1 | 1/2012 | Pennock et al. |
| 2012/0052910 A1 | 3/2012 | Mu et al. |
| 2012/0095869 A1 | 4/2012 | McKelvey |
| 2012/0097739 A1 | 4/2012 | Babu et al. |
| 2012/0118956 A1 | 5/2012 | Lamba et al. |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba et al. |
| 2012/0126010 A1 | 5/2012 | Babu et al. |
| 2012/0126011 A1 | 5/2012 | Lamba et al. |
| 2012/0126012 A1 | 5/2012 | Lamba et al. |
| 2012/0126013 A1 | 5/2012 | Sather et al. |
| 2012/0126014 A1 | 5/2012 | Sather et al. |
| 2012/0130903 A1 | 5/2012 | Dorsey et al. |
| 2012/0132712 A1 | 5/2012 | Babu et al. |
| 2012/0138683 A1 | 6/2012 | Sather et al. |
| 2012/0168505 A1 | 7/2012 | Sather et al. |
| 2012/0234918 A1 | 9/2012 | Lindsay |
| 2012/0259651 A1 | 10/2012 | Mallon et al. |
| 2012/0270528 A1 | 10/2012 | Goodman |
| 2013/0031003 A1 | 1/2013 | Dorsey et al. |
| 2013/0031004 A1 | 1/2013 | Dorsey et al. |
| 2013/0087614 A1 | 4/2013 | Limtao et al. |
| 2013/0200147 A1 | 8/2013 | Dorsey et al. |
| 2013/0200148 A1 | 8/2013 | Dorsey et al. |
| 2013/0200149 A1 | 8/2013 | Dorsey et al. |
| 2013/0200153 A1 | 8/2013 | Dorsey et al. |
| 2013/0200154 A1 | 8/2013 | Dorsey et al. |
| 2013/0204788 A1 | 8/2013 | Dorsey et al. |
| 2013/0204791 A1 | 8/2013 | Dorsey et al. |
| 2013/0204792 A1 | 8/2013 | Dorsey et al. |
| 2013/0207481 A1 | 8/2013 | Gobburu et al. |
| 2013/0254117 A1 | 9/2013 | von Mueller et al. |
| 2013/0254118 A1 | 9/2013 | Dorsey et al. |
| 2013/0320089 A1 | 12/2013 | Marcus et al. |
| 2014/0001257 A1 | 1/2014 | Dorsey et al. |
| 2014/0001263 A1 | 1/2014 | Babu et al. |
| 2014/0017955 A1 | 1/2014 | Lo et al. |
| 2014/0061301 A1 * | 3/2014 | Cho et al. ................ 235/380 |
| 2014/0076964 A1 | 3/2014 | Morley, Jr. |
| 2014/0097242 A1 | 4/2014 | McKelvey |
| 2014/0124576 A1 | 5/2014 | Zhou et al. |
| 2014/0144983 A1 | 5/2014 | Dorsey et al. |
| 2014/0203082 A1 | 7/2014 | Huh |

* cited by examiner

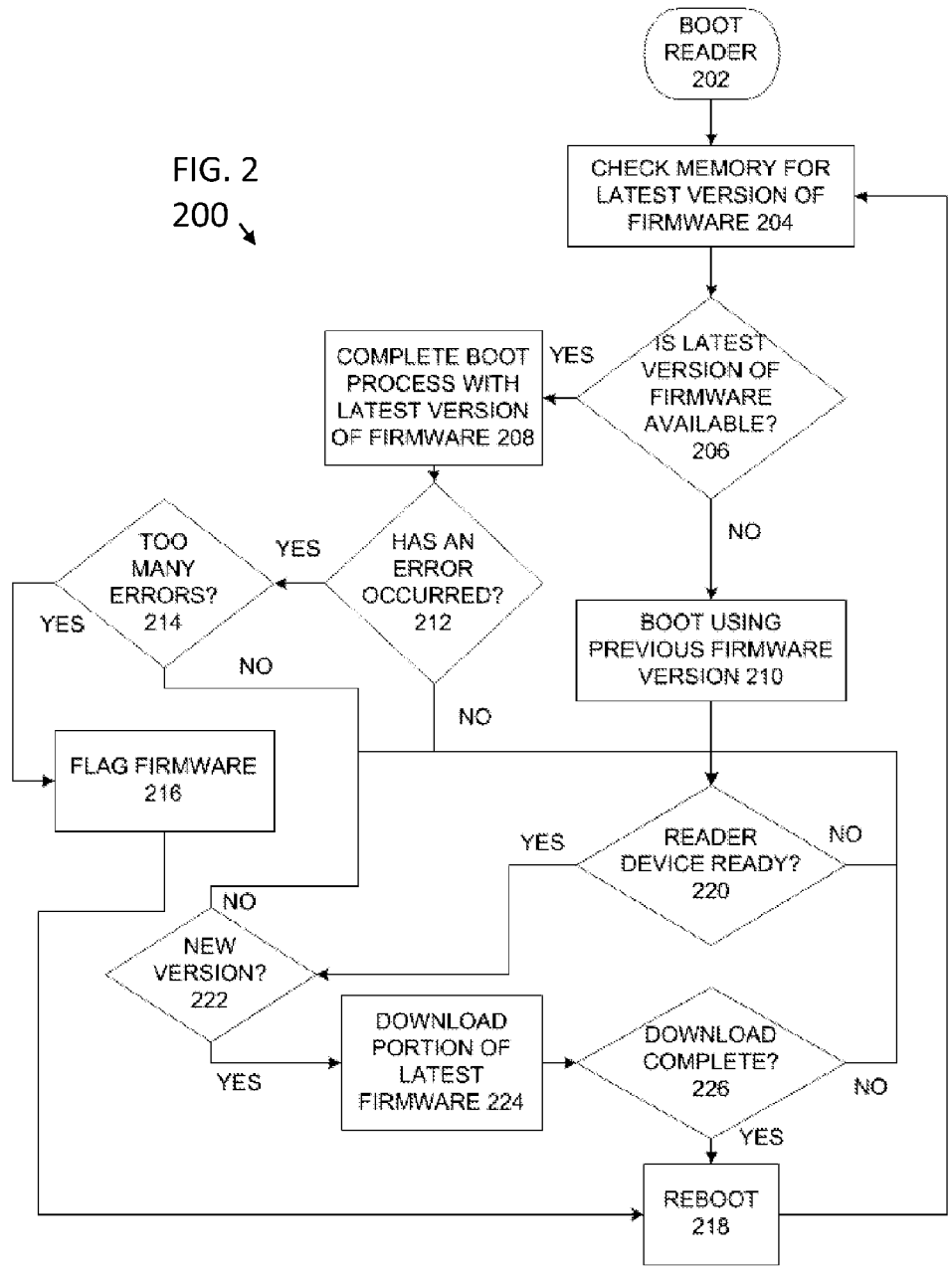

FIRMWARE MANAGEMENT

CROSS-REFERENCE TO RELATED APPLICATIONS

The application claims the benefit of U.S. Provisional Patent Application No. 61/909,626, entitled "INCREMENTAL FIRMWARE UPDATES", filed on Nov. 27, 2013, and which is hereby expressly incorporated herein by reference in its entirety.

BACKGROUND

The proliferation of mobile computing devices (such as smart phones and tablet computers, etc.), has spurned development of various attachable hardware devices to provide expanded functionality. One such example is an attachable magnetic card reader device, used for reading credit or debit card information to facilitate the receipt and processing of payments. Some such reader devices can be physically and communicatively coupled to an associated mobile device using a standard 3.5 mm audio plug when inserted into the headphone port of the mobile device (e.g., smart phone). For conventional card reader devices, only unidirectional (reader device to mobile device) communication is typically supported. As such, conventional card reader devices often lack the ability to receive information from the mobile computing device, including instructions for implementing software or firmware updates.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

FIG. 2 illustrates an example process for selection of firmwares for use and updates thereof can be implemented;

DETAILED DESCRIPTION

Figure 1:
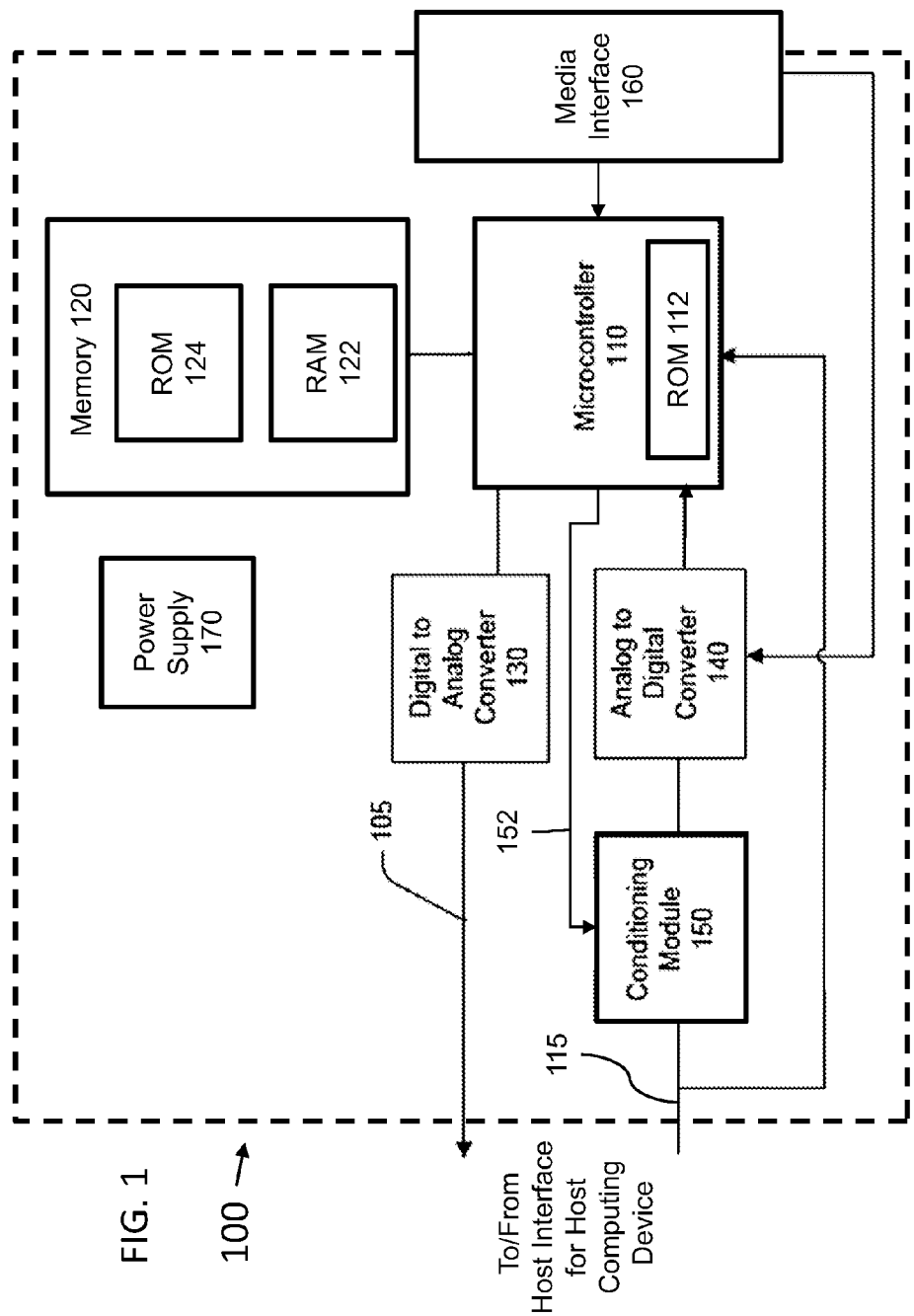
FIG. 1 illustrates a conceptual block diagram of hardware components used to facilitate incremental firmware updates for a reader device.

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the subject technology. However, it will be clear that the subject technology is not limited to the specific details set forth herein and may be practiced without these specific details. In some instances, structures and components are shown in block diagram form in order to avoid obscuring the concepts of the subject technology.

As noted above, conventional card reader devices are generally restricted to unidirectional communication over audio connections and are only capable of sending signals to a host computing device. Accordingly, once such card reader devices are manufactured, there is generally no means to update the functionality of the card reader device without disassembling the card reader device and replacing components therein. In some conventional card reader device implementations, these card reader devices can include a processor and memory storing firmware for causing the processor to control operation of the card reader device. In these cases, even though the processor could theoretically be configured to perform additional functions by updating the software or firmware stored in the memory of the card reader device, conventional card reader device implementations do not provide any means to facilitate such updating.

In particular, since the audio ports of conventional card reader devices are generally configured for unidirectional communications from the reader to a host computing device, the audio ports are not available providing updates to the card reader device. In some instances, a second non-audio connection port (e.g., universal serial bus or the like) may be provided for purposes of communicating with the host computing device to perform such updates. However, since such an update scheme relies on a connection configuration significantly different from the normal connection configuration between the card reader device and the host computing device, this complicates the update process for the average user. Moreover, this type of configuration requires that the average user actively determine whether or not an update exists and taking appropriate steps to perform the update thereafter. As a result, many users fail to update their card reader devices, out of ignorance or convenience, and continue to operate their card reader devices with older software or firmware versions. This not only results in the users not being able to take advantage of new features for the card reader device, but can also result in errors during payment processes.

The subject technology addresses the foregoing problem by providing a bidirectional reader system, as well as an upgrade method in which firmware data for operating a processor of the reader device is incrementally transferred to a reader device, without interruption to the user. In various implementations, the reader device is configured to exchange data (i.e., send and receive data) with a host computing device. In certain implementations, the host computing device can be a smart phone or tablet device and the reader device can engage in bidirectional communications via left or right audio channel buses of one or more audio connection ports, such as a standard 3.5 mm audio plug. Using one (or both) busses, firmware data can be incrementally saved to a memory partition resident on the reader device, without the need for user involvement. After a complete firmware version has been transferred to the reader, the upgraded firmware can be authenticated and implemented in the reader device, again without the need for user involvement. In other words, the updating process of the reader device is invisible to the user.

Although the present technology at times will be described with respect to a reader device implemented as a magnetic stripe card reader device with an audio plug and a host computing device implemented as a smartphone or tablet device with a corresponding audio jack, the present technology is not limited in this regard. First, the present technology can be utilized with any other type of connection between the reader device and the host computing device. Second, the host computing device is not limited to any particular type of computing device. Thus, the host computing device can also be any other type of computing device with audio and non-audio connection ports and networking capabilities, including, but not limited to, netbook computers, laptop computers, desktop computers, games consoles, set top boxes, or the like.

In some implementations, a memory of the reader device contains multiple storage volumes, areas, partitions, sections, or slots. These can be defined physically or logically. Each of these volumes can be utilized for storing different sets of software for operating the reader device. For example, these volumes can include a boot loader volume and one or more different firmware volumes. The boot loader software in the boot loader volume can be configured to access the stored firmware volumes and boot the reader using a most recent or most stable one of the firmware versions for the reader device. The boot loader can also be configured to perform security tasks including, but not limited to: verifying security/authenticity of a firmware, determining firmware completeness, and identifying a relative versions for the firmware volumes (e.g., to distinguish between newer and older firmware volumes). In some implementations the boot loader volume is stored in a "locked" mode to inhibit potential modification or tampering. For example, a switch or other control can be provided on the reader device so that the portion of the memory associated with the boot loader is placed in a read-only configuration. Alternatively or in combination with such a switch, the boot loader volume can be secured by a password, keys, or the like so that changes to the boot loader volume are allowed only when the appropriate credentials are provided.

Based on the foregoing, an update/upgrade scheme utilizing incremental or background downloading of the software or firmware for the reader device can be provided in accordance with the present technology. For example, in one implementation of the present technology, a memory of the reader device can include a boot loader volume and two firmware volumes (e.g., "Volume A" and "Volume B"). In operation, when the reader device boots, the boot loader can access one of Volumes A and B with a complete and most up-to-date firmware version and boot the reader device using that firmware version. Concurrently, the reader device can be configured to obtain, via the audio plug and the host computing device, an updated version of firmware, if available, for the reader device. Transfer or downloading of such new firmware data can be performed incrementally via the audio plug and without interruption to the user. As used herein, the term "incremental downloading" of firmware or software refers to downloading of such firmware or software on a piecewise basis, such as during periods of inactivity between the reader device and the host computing device. As such, the new data can be gradually uploaded to Volume B without requiring a consistent connection to the source of the firmware or software. Once the updated version of the firmware is available in Volume B, the reader device can be rebooted using the updated version. The techniques described herein therefore provide at least three advantages over conventional firmware or software update/upgrade methods. First, no behavioral changes (or even user interactions) are required on the part of the user. For example, there is no need for the user to wait to take special precautions during updating or to prompt the user (e.g., no need to display a "please do not unplug your reader" message or the like). Second, since the reader stores multiple firmwares, the reader is always in a usable state with the older firmware. Third, updates/upgrades can be performed without concern of the transient nature of the connection. For example, a conventional reader may undergo various unplug/plug cycles, which may even cause the reader to reset or lose some of its state information. In contrast, since the newer firmware is not applied until completely downloaded, the reader's operation is unaffected by the unplug/plug cycles.

The present disclosure contemplates that more than two firmwares may be stored on a reader device at one time. That is, under certain circumstances, several "roll backs" of the firmware may be necessary. For example, certain firmware versions can require specific versions of an application on the host computing device. Thus, the firmware can "roll back" through the various versions until a compatible firmware for the application is found.

Aspects of the present technology also provide for configuring the reader device to identify and track various metrics related to reader device performance. For example, in certain configurations, the reader device can include a combination of software and hardware components to handle errors and problems. These can include crashing handling software or firmware routines for managing crash events and logging relevant information. Such logged errors can include, for example, credit or debit card read errors, communication errors, or any other issues at the reader device. These reports can then be used to make determinations as to whether an uploaded firmware has errors or issues. Further, "watchdog" circuitry can be utilized to detect and handle problems during operation using a particular firmware version (e.g., applying a hardware reset in the event of an infinite loop). In cases where new firmware updates are deemed problematic, these software and hardware components can be used by the boot loader to determine whether to "roll back" to an older firmware version such that the reader boots from the previous partition.

FIG. 1 illustrates a conceptual block diagram of hardware components of a reader device 100 configured for bi-directional communication and incremental firmware updates, according to some aspects of the subject technology. Reader device 100 includes microcontroller 110, memory 120, digital-to-analog converter (DAC) 130, analog-to-digital converter (ADC) 140, conditioning module 150, media interface 160, and power supply 170.

As illustrated, microcontroller 110 is coupled to memory 120, DAC 130 and ADC 140. Additionally, microcontroller 110 is coupled to conditioning module 150, via audio input channel 115, as well as media interface 160, either directly or via ADC 140. In turn, ADC 140 is coupled to conditioning module 150, via audio output channel 105. Via DAC 130, audio input channel 115, ADC 140, and audio output channel 105, the reader device 100 can engage in bidirectional communications with the host computing device using audio signaling, i.e., carrier waves representing audio.

Audio signaling received on audio input channel 115 can be simultaneously provided to microcontroller 110 and conditioning module 150. Audio signaling received by the microcontroller 110 can be used to provide voltage information to the conditioning module so that the conditioning module parameters can be tuned to provide proper voltage offsets for the received audio signals via conditioning control line 152. In this way, the microcontroller 110 can "listen" to the received audio signal while adjusting conditioning parameters in order to standardize the received signals before digital conversion and further processing are performed. Conditioning module 150 can be configured to clamp incoming audio signals to eliminate negative voltage components. In certain aspects, an analog output of microcontroller 110 is provided to an ADC (e.g., ADC 130), and digital information about the received signal is output to conditioning module 150.

It is understood that reader device 100 can be implemented using various other hardware components and/or configurations, and is not limited to the architecture depicted in FIG. 1.

Microcontroller 110 can be implemented using a general-purpose processor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

Memory 120 can include various types of memories, including working memory in the form of random-access memory (RAM) 122 and read-only memory (ROM) 124. Additionally, various types of memory can be utilized in place of, or in addition to, memory 120. For example, the one or more sequences of instructions for operating the reader device 100 can be stored as the bootloader software or firmware in a ROM 112 within microcontroller 110 or in the ROM 124 within memory 120. One or more sequences of instructions can also be software stored and read from another storage medium, such as the flash memory array, or received from the host computing device (e.g., a mobile device such as a smart phone or tablet computing device) via a host interface. ROM, storage mediums, and flash memory arrays represent examples of machine or computer readable media storing instructions/code executable by microcontroller 110. Machine or computer readable media may generally refer to any medium or media used to provide instructions to microcontroller 110, including both volatile media, such as dynamic memory used for storage media or for buffers within microcontroller 110, and non-volatile media, such as electronic media, optical media, and magnetic media.

Audio output channel 105 and audio input channel 115 can form a portion of an audio bus or connector, such as a standard 3.5 mm audio plug (not shown) or other audio connector type. In some implementations, audio input channel 115 can include multiple audio input channels, such as a left-audio input channel and a right-audio input channel.

Media interface 160 can form a device, or portion thereof, for reading media located on credit cards, debit cards, or objects to obtain payment information. In some implementations, the media interface 160 can be configured to read information from a physical storage medium, such as magnetic storage media (e.g., magnetic stripe media), optical storage media (e.g., barcodes or patterns), radio-frequency identification (RFID) storage devices, and integrated circuit card media (e.g., smart chip technologies), to name a few. Alternatively or in addition to the capability of reading such passive media, the media interface 160 can also be configured in some implementations to provide a wireless or wireline interface for interacting with other devices to provide such payment information.

Note that some basic components of a system supporting bidirectional communications have been provided, the disclosure turns to a more detailed description of the methodology for managing firmware use and updates in accordance with the present technology. In particular, FIG. 2 shows a flowchart of steps in an exemplary method 200 for performing firmware management in accordance with the present technology.

Method 200 begins at step 202 with the booting of the reader device. In particular, the microcontroller 110 is powered up and invokes the boot loader from the boot loader volume. In some implementations, the boot-up process can begin when the audio plug or other connector on the reader device is coupled to a corresponding jack or port on the host computing device. Accordingly, the method 200 encompasses within step 202 a process of detecting the coupling of the audio plug or connector. For example, signals from the host computing device can be detected. Alternatively, the detection can encompass detecting a change in the electrical characteristics associated with the audio plug or detector.

Regardless of the detection method, the microcontroller can then can obtain the boot loader from memory and cause it to run. Thereafter at step 204, the boot loader can cause the microcontroller 110 determine what is the latest version of firmware available. For example, metadata identifying the versions associated with the various stored firmware versions can be compared. Such a comparison can include comparing date information, version information, or any other information specified in the boot loader for identifying different versions of firmware, including a combination of various types of information (e.g., date and version).

Once the latest version of firmware has been identified at step 204, a determination can be made at step 206 as to whether or not the latest version should be loaded. In particular, at step 206, a determination is made as to whether the latest firmware version is available for use. In particular, information regarding the download or build status (usability information) of a firmware version can be compared to usability criteria in order to determine whether or not the version is available or ready for the reader device to use. The present disclosure contemplates that there may be various reasons as to why a firmware version may be unavailable for use by the reader device. Accordingly, there may be one or more usability criteria that need to be considered. For example, in some cases, the firmware download process may simply be incomplete. In other cases, the error logging process may have resulted in the firmware as being flagged due to numerous errors during previous operation of the reader device. In still other configurations, the download process for the firmware may be complete, but the reader device may be unable to authenticate the keys or signatures associated with the firmware. However, the present technology is not limited in this regard and other criteria may be considered in making the decision as to whether or not a firmware is available for use. If the latest firmware version is available for use at step 206, the method 200 can proceed to step 208. Otherwise, the method proceeds to step 210.

At step 208, the boot loader can complete the boot process with the latest firmware version. In some implementations, as shown in FIG. 2 and as discussed above, an error logging process can be implemented. Thus, during or after the completion of the boot process, the reader device can be configured to monitor for errors. This can be performed by "watchdog" or crash handling components or subroutine implemented in the microcontroller or other element of the reader device. In some cases, the errors are simply logged. In other cases, the occurrence of an error can cause the reader device to take additional actions. For example, if an error is detected at step 212 during or after the completion of the boot process, the method can proceed to step 214.

At step 214, the error log can be reviewed to determine if too many errors have occurred. For example, the number of errors can be compared to error criteria. These criteria can be associated with a total number of errors overall or a number of errors of certain types. For example, there can be provided a threshold value for such errors. In the event these criteria are met at step 214, the firmware can be flagged at step 216 as unavailable and the reader device can be rebooted at step 218 so that a previous firmware version is used instead. The present disclosure contemplates that if the reader device is currently engaged in a payment activity, the reboot process could be deferred until the activity is completed or paused for other reasons.

In the event that a previous firmware version is used (step 210), no errors are detected (step 212) or the error criteria is not yet met (step 214), the method 200 can proceed to step 220 to begin or complete the firmware download process. First at step 220, a determination is made as to whether the reader device is currently capable or ready to begin downloading updated firmware. In the case of audio signals, the bandwidth is generally limited. Therefore, if the reader is currently engaged in payment activities, it would be undesirable to interrupt such activities to perform firmware downloads. Accordingly, the reader device can repeat step 220 until the reader device is ready.

Once the reader device is ready at step 220, the method proceeds to step 222 to determine whether a new version of the firmware, with respect to the currently running version, is available. This can encompass sending a request via the host computing device to an update server for information on new version and comparing this information to information regarding the currently stored firmwares. This step can also encompass determining whether a download needs to be completed (in the case of a previous partial download) or redone (in the case of firmwares with errors). If no update is available, then the method repeats steps 220 and 222 until such an update is available or the reader device is restarted.

If a new version is available (or a download of the new version needs to be completed or redone), the method can proceed to step 224 to download the latest firmware. As noted above, the download at step 224 can be performed incrementally or piecewise during periods of inactivity of the reader device. That is, during periods in which the reader device is not in communication with the host computing device for processing a transaction or performing so other primary function. Thereafter, completion of the download of the firmware can be detected at step 226. If the download is complete at step 226, the method can proceed to step 218 to reboot the reader device so that the newly downloaded firmware is used. Otherwise, the additional portions of the firmware are downloaded by repeating steps 220-226.

The present disclosure also contemplates that in some instances, a new version of the firmware may be available prior to completion of the downloading of a previous version. Therefore, in some configurations, the incomplete version may be deleted or overwritten by the newer version. Alternatively, the reader device can allow the download of the incomplete version to be completed prior to beginning the download of a newer version.

The present disclosure further contemplates that in some instances several updated versions of a firmware may be available in a short amount of time. In most configurations, a first-in, first-out (FIFO) policy can be utilized to store newer firmware versions in favor of older firmware versions. However, it is desirable to ensure that at least one stable version of the firmware is available at the device. Accordingly, in some implementations, the download process can be deferred based on an age or use criteria. For example, consider the case of a reader device with storage capacity for two firmwares. After a first firmware update is downloaded to the reader device with an original firmware and a second firmware update becomes available shortly thereafter, it may be undesirable to overwrite the original firmware too soon. Rather, it may be useful to test the first firmware update to ensure it is stable in the event the second firmware update is unstable. Thus, download of the second firmware update can be delayed or deferred until the first firmware update meets a use or age criteria and is not yet flagged as being associated with errors. Further, in the case where the first firmware update is flagged, the reader device can temporarily ignore the FIFO policy and overwrite the unstable first firmware update instead of the stable original firmware. Accordingly, at least one stable version of firmware persists on the reader device.

The present disclosure additionally contemplates that the check at step 222 can result in the identification of a preferred firmware for the reader device. In some cases, the preferred firmware is simply the newest or latest version available. However, in other cases, an older version can be preferred for various reasons. For example, there may have been issues identified with the newer version. In another example, an older version can be preferred based on the application on the host computing device. Thus, rather than attempting to download the newest version, the preferred version can be downloaded instead.

Figure 3A:
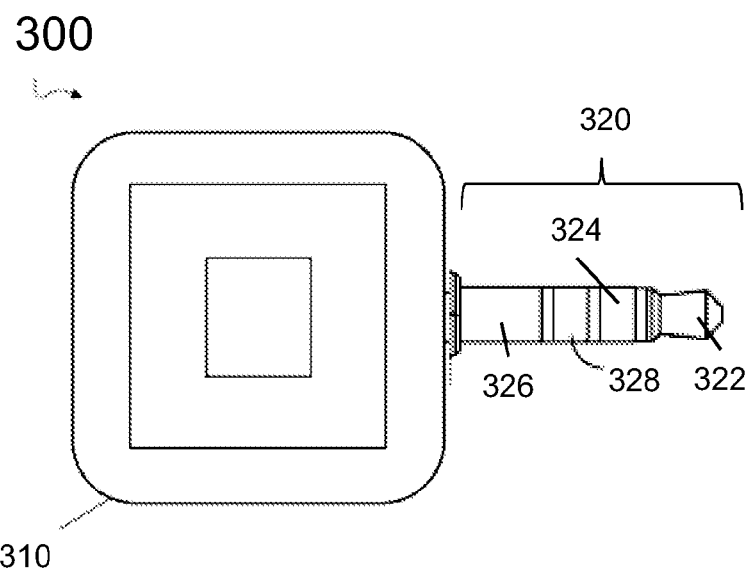
FIGS. 3A and 3B illustrate front and side views of an example card reader device, including a 3.5 mm audio plug.
Figure 3B:
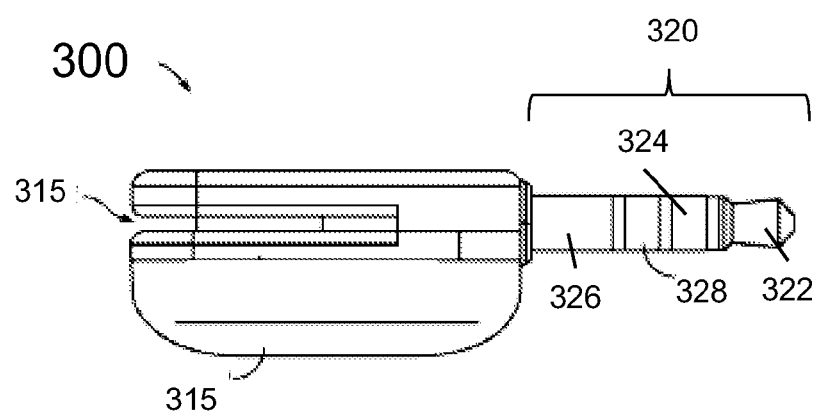

FIGS. 3A and 3B illustrates an example reader 300 according to some embodiments of the subject technology. As illustrated, reader 300 includes a housing 310 that is coupled to an audio plug 320 (e.g., a 3.5 mm audio plug).

Housing 310 contains the hardware components and circuitry of reader 300, as illustrated with respect to the example of FIG. 1. Additionally, housing 310 includes a slot 315 through which a payment card, such as a credit or debit card, may be swiped. Passage of a magnetic stripe of the payment card past a read head (e.g., media interface 160 contained in housing 310) can enable payment information to be received via the read head. The resulting signal provided by the read head is typically an analog signal that must be digitized e.g., using ADC 140, before the resulting digital information is provided to microcontroller 110.

Different types of information can be read from a magnetic stripe, depending on implementation. For example, user and payment card account information can be read from track 1 and track 2 of the magnetic stripe, respectively. However, in other implementations, any track (or combination of tracks) may be read from the magnetic stripe, including any combination, or all of tracks 1, 2 and 3.

As illustrated, body portion 310 is physically and communicatively coupled to audio plug 320, which can be removably inserted into a headphone port of a host device, such as a smart phone, personal computer, tablet device, or the like. As discussed above with respect to FIG. 1, audio plug 320 forms part of an audio bus that includes left and right audio output channels (via left/right contacts 322, 324), an audio input channel (via microphone contact 326), and a ground connection (via ground contact 328). Once audio plug 320 is inserted into the compatible jack of a host device, such as a smartphone, bi-directional communication between reader 300 and the host is enabled e.g., via the left/right audio output channels and audio input channel, using the methods and systems discussed above.

Although the reader illustrated in FIG. 3 can accept payment cards containing a magnetic stripe (e.g., using a read head), it is understood that the reader can be configured to receive other types of payment cards, and accordingly can contain additional or different hardware and/or software modules than those described above with respect to FIG. 1. For example, housing 310 can include a read head (in the form of a dip slot) for accepting integrated circuit cards, such as those conforming to the Europay, Mastercard, and Visa (EMV) standard. Such a read head can be incorporated into slot 315 or in separate slot (not shown) in housing 310.

Once successful bidirectional communication has been established between the reader and its host, the reader can be used to facilitate a payment transaction, for example between a merchant and a buyer using a magnetic payment card.

Figure 4:
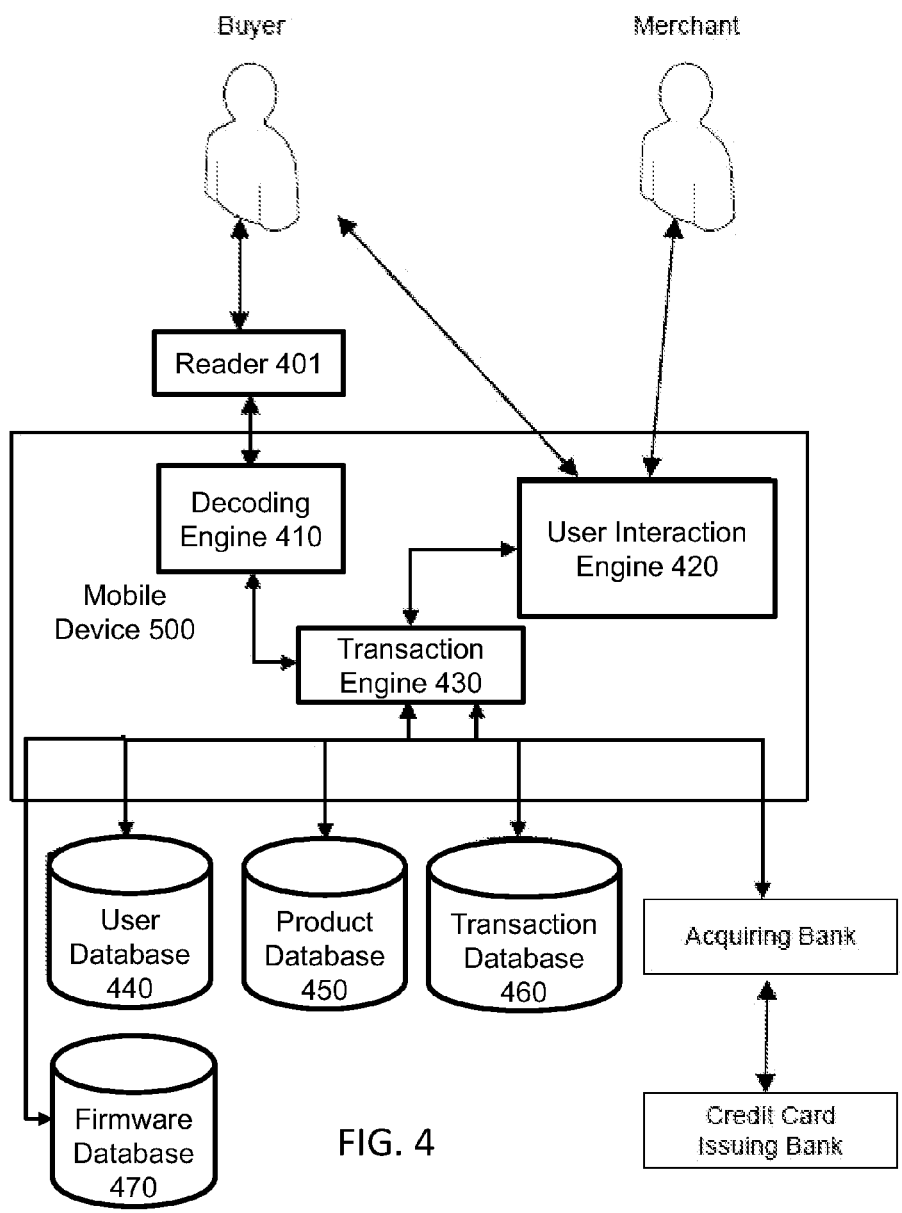
FIG. 4 depicts a conceptual environment in which a reader device of the subject technology can be used to facilitate a financial transaction between a buyer and a merchant.

FIG. 4 depicts a conceptual environment in which a reader of the subject technology can be used to facilitate a financial transaction between a buyer and a merchant. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein multiple hosts can be connected by one or more networks.

In the example of FIG. 4, the system includes a mobile device 400, a reader 401 connected to mobile device 400, a decoding engine 410, a user interaction engine 420, and a transaction engine 430, all running on mobile device 400. Additionally, the system may also include one or more of a user database 440, a product or service database 450, a transaction database 460, and a firmware database 470 all coupled to the transaction engine 430. Thus, to perform firmware updates in accordance with the present technology, the transaction engine 430 can invoke an update routine to retrieve updated firmwares and associated information from firmware database 470.

As used herein, the term engine refers to software, firmware, hardware, and/or other components used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

In the example of FIG. 4, mobile device 400 to which reader 401 is connected can be, but is not limited to, a cell phone, such as Apple's iPhone, other portable electronic devices, such as Apple's iPod Touches, Apple's iPads, and mobile devices based on Google's Android operating system and any other portable electronic device that includes software, firmware, hardware, or any combination capable of at least receiving the signal, decoding if needed, exchanging information with a transaction server to verify the buyer and/or seller's account information, conducting the transaction, and generating a receipt. Typical components of mobile device 400 can include but are not limited to persistent memories like flash ROM, random access memory like SRAM, a camera, a battery, LCD driver, a display, a cellular antenna, a speaker, a Bluetooth circuit, and WiFi circuitry, where the persistent memory may contain programs, applications, and/or an operating system for the mobile device.

In some implementations, a system is provided with transaction engine 430 running on mobile device 400. In response to a financial transaction between a buyer and a seller, mobile device 400 accepts information selected including but not limited to information from financial transaction or information pertaining to financial transaction card used by the buyer in the transaction. Additionally, a financial transaction device can be utilized, Non-limiting examples of financial transaction devices include but are not limited to a, wristband, RFID chip, cell phone, biometric marker and the like. At least a portion of this information is communicated with a third party financial institution or payment network to authorize the transaction.

Payment confirmation can be made with a communication channel of the buyer's choice. As non-limiting examples, confirmation of payment can be an electronic notification in the form selected from at least one of, email, SMS message, tweet (message delivered via Twitter), instant message, communication within a social network and the like. In response to the transaction, a confirmation is made that the buyer is authorized to use the financial transaction card. In certain implementations, a confirmation can be provided that indicates a sufficiency of funds available to the buyer.

In the example of FIG. 4, reader 401 is configured to read data encoded in a magnetic strip of a card being swiped by a buyer and send a signal that corresponds to the data read to mobile device 400. However, as discussed above, reader 401 may be configured to received various payment card types, including but not limited to IC cards that can be provided to reader 401 using a dip slot.

The size of reader 401 can be miniaturized to be portable for connection with mobile device 400. For example, the size of card reader 401 can be miniaturized to an overall length of less than 1.5". In addition, the miniaturized card reader 401 is also designed to reliably read the card with minimum error via a single swipe by counteracting vendor specific filtering done by mobile device 400. Note that this broad overview is meant to be non-limiting as components to this process are represented in different embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only and recordable Blu-Ray® discs, ultra density optical discs, any other optical or magnetic media. The computer-readable media can store a computer program that is executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A card reader, comprising:
a read head; an audio plug for engaging a corresponding audio jack associated with a host mobile device; at least one processor communicatively coupled to the card reading device and the audio plug; and a memory comprising a plurality of instructions for causing the processor to detect when the audio plug is engaged with the audio jack and perform, upon detecting the engaging of the audio plug with the audio jack, the steps comprising:
obtaining version information for a first firmware stored in first portion of the memory and a second firmware stored in a second portion of the memory,
determining whether either of the first firmware or the second firmware is usable for operating the card reader,
operating the card reader using one of the first firmware or the second firmware that is usable and for which the version information is most recent,
detecting an inactivity in communications via the audio plug between the card reader and the host mobile device,
upon detecting the inactivity, initiating a download via the audio plug to complete or replace another of the first firmware or the second firmware.

2. The card reader of claim 1, wherein the determining whether either of the first firmware or the second firmware is usable for operating the card reader is based on an evaluation of at least one of validation data, completeness data, or error data associated with the first firmware and the second firmware.

3. The card reader of claim 1, wherein the memory further comprises instructions for causing the at least one processor to perform the steps of:
detecting whether the other of the first firmware and the second firmware has become usable for operating the card reader subsequent to the operating, and
upon determining that the other of the first firmware and the second firmware has become usable for operating the card reader, restarting the card reader to operate the card reader using the other of the first firmware and the second firmware.

4. The card reader of claim 1, wherein the memory further comprises instructions for causing the at least one processor to perform the steps of:
detecting whether the one of the first firmware and the second firmware has become unusable for operating the card reader, and
upon detecting that the one of the first firmware and the second firmware has become unusable for operating the card reader, restarting the card reader.

5. The card reader of claim 1, wherein the memory further comprises instructions for causing the at least one processor to:
pausing the download upon detecting activity in communications via the audio plug between the card reader and the host mobile device subsequent to the inactivity, and
resuming the download upon re-detecting inactivity in communications via the audio plug between the card reader and the host mobile device.

6. The card reader of claim 1, wherein the memory further comprises instructions for causing the at least one processor to:
upon determining that both of the first firmware and the second firmware are usable for operating the card reader, deferring the initiating of the download until an age criteria is met for the one of the first firmware and the second firmware.

7. A media reader comprising:
a media reading device;
an audio connector for engaging an audio port associated with a networked computing device;
a processor communicatively coupled to the media reading device and the connector; and
a memory having a first partition storing a first firmware and comprising a plurality of instructions for causing the processor to:
detect the audio connector being engaged with the audio port;
detecting an inactivity in communications via the audio plug between the card reader and the networked computing device; and
upon detecting the inactivity, initiating a download via the audio plug to complete or replace the first firmware by downloading a second firmware, the download being stored in a second partition of the memory.

8. The media reader of claim 7 wherein the memory further comprises instructions for causing the processor to:
pause the download of the second firmware upon detecting activity in communications via the audio plug between the card reader and the networked computing device subsequent to the inactivity.

9. The media reader of claim 7 wherein the memory further comprises instructions for causing the processor to:
determine whether the second firmware is usable for operating the card reader based on an evaluation of at least one of validation data, completeness data, or error data associated with the first firmware and the second firmware.

10. The media reader of claim 7 wherein the memory further comprises instructions for causing the processor to:
determine that the second firmware download is not complete; and
resume the download of the second firmware upon detecting a second period of inactivity.

11. The media reader of claim 7 wherein the memory further comprises instructions for causing the processor to:
determine that a firmware update download is available, the firmware update download being the second firmware; and
defer the initiation of the download of the second firmware until an age criteria is met for the first firmware.

12. The media reader of claim 7 wherein the memory further comprises instructions for causing the processor to:
detect that the second firmware has become usable for operating the card reader; and
restart the card reader to operate the card reader using the second firmware.

13. The media reader of claim 7 wherein the download of the second firmware comprises overwriting another firmware version already stored in the second partition of the memory.

14. A computer-readable medium having stored thereon a computer program for operating device electronics in a media reader with at least one media reading device and a connector for engaging a communications port associated with a networked computing device, the computer program comprising a plurality of code sections for:
obtaining version information and usability information associated with at least one firmware stored in the device electronics;

determining whether version information for a preferred firmware for the media reader corresponds to the version information for any of the at least one firmware;

upon determining that the version information for the preferred firmware fails to correspond to the version information for any of the at least one firmware or upon determining that the version information for the preferred firmware corresponds to the version information for one of the at least one firmware and the usability information for the one of the at least one firmware fails to meet a usability criteria, performing a download of the preferred firmware to the device electronics via the connector during periods of inactivity of the media reader.

15. The computer-readable medium of claim 14, the computer program further comprising code sections for:

determining whether that the download of the preferred firmware is complete, and upon determining the download of the preferred firmware is complete, restarting the media reader.

16. The computer-readable medium of claim 14, wherein the usability information for each of the at least one firmware comprises at least one validation key, and wherein the usability criteria comprises whether the at least one validation key for a corresponding one of the at least one firmware can be validated.

* * * * *